United States Patent [19]

Kalbe et al.

[11] Patent Number: 5,466,794
[45] Date of Patent: Nov. 14, 1995

[54] THERMOPLASTIC CELLULOSE ETHER ESTER GRAFT COPOLYMERS AND PROCESS FOR THEIR PRODUCTION

[75] Inventors: Jochen Kalbe, Essen; Hanns P. Müller, Odenthal; Rainhard Koch, Köln; Jürgen Engelhardt; Wolfgang Koch, both of Bomlitz; Klaus Szablikowski, Walsrode; Gunter Weber, Fallingbostel, all of Germany

[73] Assignee: Wolff Walsrode Aktiengesellschaft, Walsrode, Germany

[21] Appl. No.: 245,350

[22] Filed: May 17, 1994

[30] Foreign Application Priority Data

May 24, 1993 [DE] Germany .................. 43 17 231.8

[51] Int. Cl.$^6$ .............................. C08B 13/00; C08L 1/26; D01F 2/28; C08F 251/02
[52] U.S. Cl. .............................................. 536/66
[58] Field of Search .................................. 536/66

[56] References Cited

U.S. PATENT DOCUMENTS

| | | | |
|---|---|---|---|
| 2,724,633 | 11/1955 | Daul et al. ........................ | 536/66 |
| 4,508,895 | 4/1985 | Balser . | |
| 4,529,788 | 7/1985 | Asami et al. . | |
| 4,906,744 | 3/1990 | Peuscher et al. .................. | 536/63 |

FOREIGN PATENT DOCUMENTS

| | | |
|---|---|---|
| 0093368 | 11/1983 | European Pat. Off. . |
| 2152944 | 8/1985 | United Kingdom . |

OTHER PUBLICATIONS

Chemical Abstracts, vol. 93; "Anionic Cellulose Derivatives", Fuji Chemical Co Ltd, JP 55065202, JP 78–139055; one page. 1984.

*Primary Examiner*—Nathan M. Nutter
*Attorney, Agent, or Firm*—William C. Gerstenzang; Sprung Horn Kramer & Woods

[57] ABSTRACT

The present invention relates to novel thermoplastic, water-insoluble cellulose hydroxyalkyl hydroxycarboxylic acid esters of the general structure $$\text{Cell—O—R}$$

where Cell—O is the substituted OH group of a polymeric cellulose unit and R is either a monomeric and/or polymeric hydroxyalkylether hydroxycarboxylic acid ester of the structure X:

$$X = \text{—A—B—}$$

in which A is a linear polyether chain:

$$A = (\text{—D—O—})_n$$

in which D signifies a linear aliphatic branched or unbranched chain with 2 to 11 C atoms and n is a whole number equal to or greater than 1, and B is a linear polyester chain:

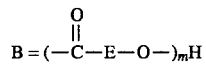

in which E signifies a linear aliphatic branched or unbranched chain with 2 to 5 C atoms and m is a whole number equal to or greater than 1, or R is equal to A or B or X and a combination thereof in any ratio, or R is equal to H (hydrogen) according to the degree of substitution per anhydroglucose unit (max. 3) with A, B or X, and a process for their production and use of these cellulose derivatives as biodegradable mouldings.

6 Claims, No Drawings

THERMOPLASTIC CELLULOSE ETHER ESTER GRAFT COPOLYMERS AND PROCESS FOR THEIR PRODUCTION

The present invention relates to novel thermoplastic cellulose ether esters and the production of such cellulose graft copolymers of undissolved cellulose with epoxides and lactones.

Cellulose ethers, such as e.g. hydroxyethylcellulose or hydroxypropylcellulose, are water-soluble cellulose derivatives which may be produced by etherification of alkali cellulose with epoxides such as e.g. ethylene oxide or propylene oxide. The procedure in this case is generally such that the cellulose is alkalised with sodium hydroxide solution and subsequently reacted with alkylene oxides in an inert suspending agent (cf. e.g. EP 0093368; Encyclopedia of Polymer Science and Technology, vol. 3, 1985).

Cellulose esters, such as e.g. cellulose triacetate, are generally synthesised in a solution process with acetic acid as solvent by reaction of the cellulose with carboxylic acid anhydrides (cf. Encyclopedia of Polymer Science and Technology, vol. 3, 1985). The swelling process in the acetic acid here serves at the same time to activate the cellulose. At degrees of substitution greater than 2.5 the cellulose esters thus obtained are thermoplastic and may be extruded into mouldings.

Cellulose ether esters described in the literature are synthesised by post-esterification of a cellulose ether with carboxylic acid anhydrides or also with acid chlorides (cf. JP 142938; Macromolecules, 18/9, 1985, 1746–52).

In order to prepare these ether ester graft copolymers, therefore, the cellulose ether must first be synthesised by conventional synthesis and isolated. Subsequently, the production of the cellulose ether ester takes place by analogous ester synthesis.

Cellulose can be reacted with lactones to give cellulose hydroxycarboxylic acid esters by the process of German application P 42283760.0, now published as EP 0 584 677. In this process cellulose is activated with lye and subsequently reacted with lactones in suspension—without the use of cellulose-specific solvents. This gives rise to a polymeric ester as a cellulose side chain. The cellulose hydroxycarboxylic acid esters thus synthesised are thermoplastic and biodegradable.

The aim of the present invention is the synthesis of novel cellulose ether esters by the reaction of alkylene oxides such as ethylene oxide or propylene oxide with alkaline-activated cellulose and further grafting of the cellulose ether without isolation of the intermediate products with lactones.

By the combination of ether and ester and the selection of any degrees of substitution, an increased range of property profiles should thereby be achieved.

The object of the invention is therefore to produce thermoplastic cellulose derivatives of cellulose grafted with alkylene oxides and lactones.

The object of the present invention is further a process for the production of such water-insoluble, thermoplastic cellulose hydroxyalkyl hydroxycarboxylic acid esters which is characterised in that the cellulose is activated with lye and then reacted with epoxides either in suspension or completely without suspending agents or solvents, and subsequently reacted with lactones in the same reaction mixture.

The cellulose hydroxyalkylether hydroxycarboxylic acid esters to be produced by this process may be described by the general structure:

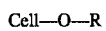

where Cell—O represents the substituted OH groups of a polymeric cellulose unit and R is either a monomeric and/or polymeric hydroxyalkylether hydroxycarboxylic acid ester of structure X:

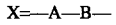

in which A is a linear polyether chain of the following structure:

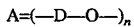

in which D signifies a linear aliphatic branched or unbranched chain with 2 to 11 C atoms and n is a whole number equal to or greater than 1, and B is a linear polyester chain of the following structure:

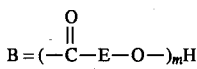

in which E signifies a linear aliphatic branched or unbranched chain with 2 to 5 C atoms and m is a whole number equal to or greater than 1, or R is equal to A or B or X and a combination thereof in any ratio, or R is equal to H (hydrogen) according to the degree of substitution per anhydroglucose unit (max. 3) with A, B or X.

For the synthesis pulp or cotton linters are activated with lye. This activation may take place through the synthesis and isolation of an alkali cellulose and alternatively by the production of a water-moist alkali cellulose or a suspension of the cellulose in water-miscible solvents and subsequent addition of an aqueous alkali solution.

Activating treatments, such as e.g. with liquid ammonia or ultrasound, may additionally be used.

Before the start of the etherification and esterification reaction the water and/or solvent-moist alkali cellulose is subjected to a solvent wash, whereby a defined NaOH content may be established.

The activation may also be carried out by spraying on an aqueous NaOH solution. The epoxide is grafted on to the cellulose activated in this way and the water present in the reaction mixture is distilled off before the reaction with the lactone. The reaction with epoxides and lactones may be conducted in suspension or free from suspending agents.

For this purpose the epoxide is first reacted with the alkali cellulose and the lactone is subsequently reacted with the alkaline hydroxyalkylcellulose formed. It is completely surprising here that the lactone can be grafted on to the hydroxyalkylcellulose without further ado, since it is known that polyethylene glycols do not permit a ring-opening polymerisation owing to complexing properties with respect to alkali metals (cf. H. Höcker, Eur. Polym. J. vol. 27, no. 12, 1323–1330, 1991).

When suspending agents such as DMSO, DMAc or DMF are used, the product passes into solution and the viscosity of the reaction mixture increases.

In suitable stirred autoclaves which guarantee adequate mixing of the cellulose powder the synthesis may be carried out without a suspending agent. The product formed in this case may be used for technical processing, such as e.g. injection moulding, without further treatment.

On completion of the reaction in suspending agent systems the water-insoluble polymer formed is precipitated out with water, filtered and dried and may be processed immediately, e.g. converted into mouldings by injection moulding.

The cellulose derivative synthesised without solvents may be freed from any monomers and oligomers or carboxylic acid salts present by extraction with water or solvents such as e.g. methylene chloride or acetonitrile.

The polymers thus synthesised are injection mouldable and thermoplastic with a melting point varying between 80° C.– 250° C. depending on the degree of substitution and ratio of alkylene oxide and lactone. This widely adjustable melting range is surprising and was not predictable by the person skilled in the art, since pure cellulose-lactone grafts exhibit melting ranges between 180° and 250° C. and pure hydroxyalkylcelluloses are thermoplastic only at high degrees of substitution (MS greater than 4.0) and exhibit melting points of between 180° and 200° C.

Technically accessible cellulose, such as e.g. wood pulp and cotton linters of any molecular weight, or other cellulose-containing products such as e.g. sawdust, is suitable for the synthesis. In order to adjust the molecular weight it is possible to carry out an oxidative chain degradation by atmospheric oxygen by known methods during the treatment with alkali hydroxides. Any fibre lengths may be used, preferably shorter than 2000 μm, particularly preferably shorter than 1000 μm.

If the synthesis is conducted in suspending agents, water-miscible compounds or mixtures thereof such as DMSO, DMF, DMAc, dioxan, THF, pyridine, NMP, methyl morpholine etc. are suitable, alcohols being less suitable.

Suitable as lactones are e.g. β-propiolactone, γ-butyrolactone, β-butyrolactone, δ-valerolactone, glycolide, lactide and particularly preferably ε-caprolactone.

Suitable as epoxides are preferably monoepoxides such as ethylene oxide, propylene oxide, 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane, stearic acid glycidyl ether, epoxybutyl stearate, lauryl glycidyl ether, glycidyl methyl ether, glycidyl ethyl ether, glycidyl propyl ether, glycidyl butyl ether, glycidyl tertiary-butyl ether, glycidyl acrylate, glycidyl methacrylate, allyl glycidyl ether, butadiene monoxide, glycidol, 3-glycidoxypropyl trimethoxysilane, 3-glycidoxypropyl triethoxysilane, di-N-butylamino-2,3-epoxypropane, diethyl-β,γ-epoxypropyl phosphate, 4-(2,3-epoxypropyl)morpholine and styrene oxide.

The activation of the cellulose takes place with lye. Various methods may be used here.

On the one hand the alkali cellulose may be produced by treatment of the cellulose with aqueous lye (mash alkalisation), subsequent filtration and drying. In this case the concentration of the sodium hydroxide solution is 5–50% w/w, preferably 10–25% w/w. The alkali content of the alkali cellulose thus produced is 1–30% w/w, preferably 5–15% w/w.

Alternatively, the treatment of the cellulose with aqueous lye may be carried out in a suspension of the cellulose in organic suspending agents such as e.g. alcohols (slurry process).

Both the alkali celluloses prepared by mash alkalisation and those prepared by the slurry process may be extracted with solvents/mixtures as described in EP 0093368. In this way uncombined alkali and excess water may be removed from the alkali cellulose.

A further variant of the activation is to treat the cellulose in the stirred autoclave with aqueous alkali and to perform the reaction with the epoxide immediately afterwards. The water present in the reaction mixture is subsequently distilled off and the lactone grafted on to the still alkaline cellulose ether.

For the reaction with the epoxide the reaction temperature is 20°–130° C., preferably 50°–80° C. The reaction times are 0.5–2 h, preferably 0.5–1 h.

The reaction temperature of the alkaline cellulose ether with the lactone is 60°–170° C., preferably 90°–140° C., particularly preferably 110°–130° C. The reaction times are 0.5–4 h, preferably 1–2 h.

The cellulose hydroxyalkyl hydroxycarboxylic acid esters prepared by the process according to the invention are water-insoluble, but soluble in organic solvents such as DMSO, DMF, DMAc, dioxan, THF or n-butanol.

Further, these compounds are thermoplastic and capable of conversion to e.g. injection mouldings or films by conventional processing techniques.

The cellulose derivatives according to the invention are suitable for the production of (biodegradable) films, pots, bottles and other mouldings. They may be varied in their properties by the production of blends of any composition with other (biodegradable) components such as e.g. starch or underived cellulose. Combination with plasticisers is also possible.

The object of the present invention is to be explained in even greater detail by means of the present examples.

EXAMPLE 1

1 kg cotton linters is stirred in 20 kg 20% NaOH for 30 minutes at 25° C. and the aqueous NaOH solution is subsequently centrifuged off in a centrifuge. The filter cake is subsequently stirred in 9.6 l methanol/water (ratio 85:15) and centrifuged, stirred again in 8 kg methanol and centrifuged again. Finally the alkali cellulose is stirred in 7 kg DMSO and centrifuged, and approx. 2.6 kg DMSO-moist alkali cellulose remains with an alkali content of approx. 7% w/w.

52.4 g of the DMSO-moist alkali cellulose thus produced is stirred in 700 g DMSO with 62 g ε-caprolactone and 23.9 g ethylene oxide in a 5 bar nitrogen atmosphere at 140° C. for 1.5 h. The reaction solution is subsequently poured into 5 l water and the product obtained is filtered off. The cellulose hydroxyalkyl hydroxycarboxylic acid ester thus obtained is purified of DMSO by washing with water and subsequently dried. To determine the degree of substitution by means of elemental analysis and NMR the product is freed from oligomers by extraction with acetonitrile. The yield is 80 g (77% of theoretical value) and the softening point is 165° C.

EXAMPLE 2

The activation of the cellulose with sodium hydroxide solution takes place as in example 1.

15.8 g propylene oxide in 350 ml DMSO is dropped into 26.2 g of the alkali cellulose thus obtained at 60° C. under a nitrogen atmosphere, stirring. After 0.5 h the reaction mixture is heated to 120° C. and 30.1 g ε-caprolactone is added dropwise, stirring for 1 h. The reaction solution is added to 2 l water and the precipitated product is filtered off and washed with water. In order to separate off oligomers the cellulose derivative is extracted with methylene chloride. The yield is 40 g (72% of theoretical value) and the softening point is 200° C.

EXAMPLE 3

The preparation of the alkali cellulose takes place as in example 1.

In a stirred autoclave 10 g ethylene oxide is metered into 50.8 g alkali cellulose at ambient temperature under 5–10 bar nitrogen atmosphere and the reaction mixture is heated to 130° C. within 0.5 h, stirring. 99 g ε-caprolactone is then added and stirred for 1 h at 130° C. Following extraction with methylene chloride, 80 g product remains (64% of theoretical value) and the softening point is 200° C.

EXAMPLE 4

1084 g cotton linters are alkalised in 22.5 l isopropanol and 2.5 l water and 0.63 kg NaOH pellets for 90 minutes at 25° C. They are subsequently washed with 10 l isopropanol/water (80/20) and centrifuged and again stirred with 10 l isopropanol and centrifuged. The alkali cellulose thus produced has an alkali content of 6.8%.

93.6 g ethylene oxide is metered into 250 g of the alkali cellulose thus obtained under a nitrogen atmosphere in a stirred autoclave. The reaction mixture is heated to 130° C. within 0.5 h and 970 g ε-caprolactone is subsequently added, stirring for 1 h at 130° C. Following extraction with acetonitrile 758 g of product remains (69% of theoretical value) and the softening point is 180° C.

EXAMPLE 5

55.6 g 18% NaOH is added to 85 g cotton linters in a stirred autoclave and mixed for 1 h at 25° C. 44 g ethylene oxide is added under a nitrogen atmosphere and the reaction mixture is stirred for 1 h at 50° C. The water present in the autoclave is distilled off and 457 g ε-caprolactone is added at 130° C. The esterification reaction is conducted for 1 h at 130° C. Following extraction with acetonitrile, 398 g product remains (68% of theoretical value). The softening point is 230° C.

We claim:

1. Thermoplastic, water-insoluble, cellulose hydroxyalkyl hydroxycarboxylic acid esters of the general structure:

Cell—O—R where Cell—O represents the substituted OH groups of a polymeric cellulose unit and each R is either a monomeric hydroxyalkylether hydroxycarboxylic acid ester or a polymeric hydroxyalkylether hydroxycarboxylic acid ester of the structure X:

X=—A—B— in which A is a linear polyether chain:

A=(—D—O—)$_n$ in which D signifies a linear aliphatic branched or unbranched chain with 2 to 11 C atoms and n is a whole number equal to or greater than 1, and B is a linear polyester chain:

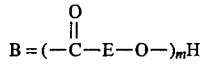

in which E signifies a linear aliphatic branched or unbranched chain with 2 to 5 C atoms and m is a whole number equal to or greater than 1, or R is equal to A B, X or a combination thereof or R is equal to H (hydrogen), according to the degree of substitution per anhydroglucose unit (max. 3) with A, B or X.

2. Process for the production of water-insoluble and thermoplastic cellulose derivatives according to claim 1, characterized in that the cellulose is reacted with epoxides and lactones, whereby the cellulose is activated with lye and subsequently reacted, either with or without a suspending agent, with epoxides and subsequently in the same reaction mixture, with lactones.

3. Process according to claim 2, characterised in that the cellulose is pre-activated by treating with aqueous NaOH or mixtures of aqueous NaOH with water-soluble organic solvents.

4. Process according to claims 2 or 3 in which the alkali cellulose is freed from water either by drying or extraction with organic solvents.

5. Process according to claim 2, in which the water-moist alkali cellulose is reacted with epoxides, the water is subsequently distilled off and the still alkaline hydroxyethylcellulose is reacted with lactones.

6. Mouldings, films, fibres and blends, characterised in that they consist of at least 10% cellulose hydroxyalkyl hydroxycarboxylic acid esters according to claim 1.

* * * * *